3,151,950
METHOD AND APPARATUS FOR DRYING THIN COATINGS ON METALLIC SHEETS
Milton Herman Newman, Lincolnwood, and Raymond Edward Mietz, Barrington, Ill., assignors to American Can Company, New York, N.Y., a corporation of New Jersey
Filed June 14, 1960, Ser. No. 35,964
12 Claims. (Cl. 34—4)

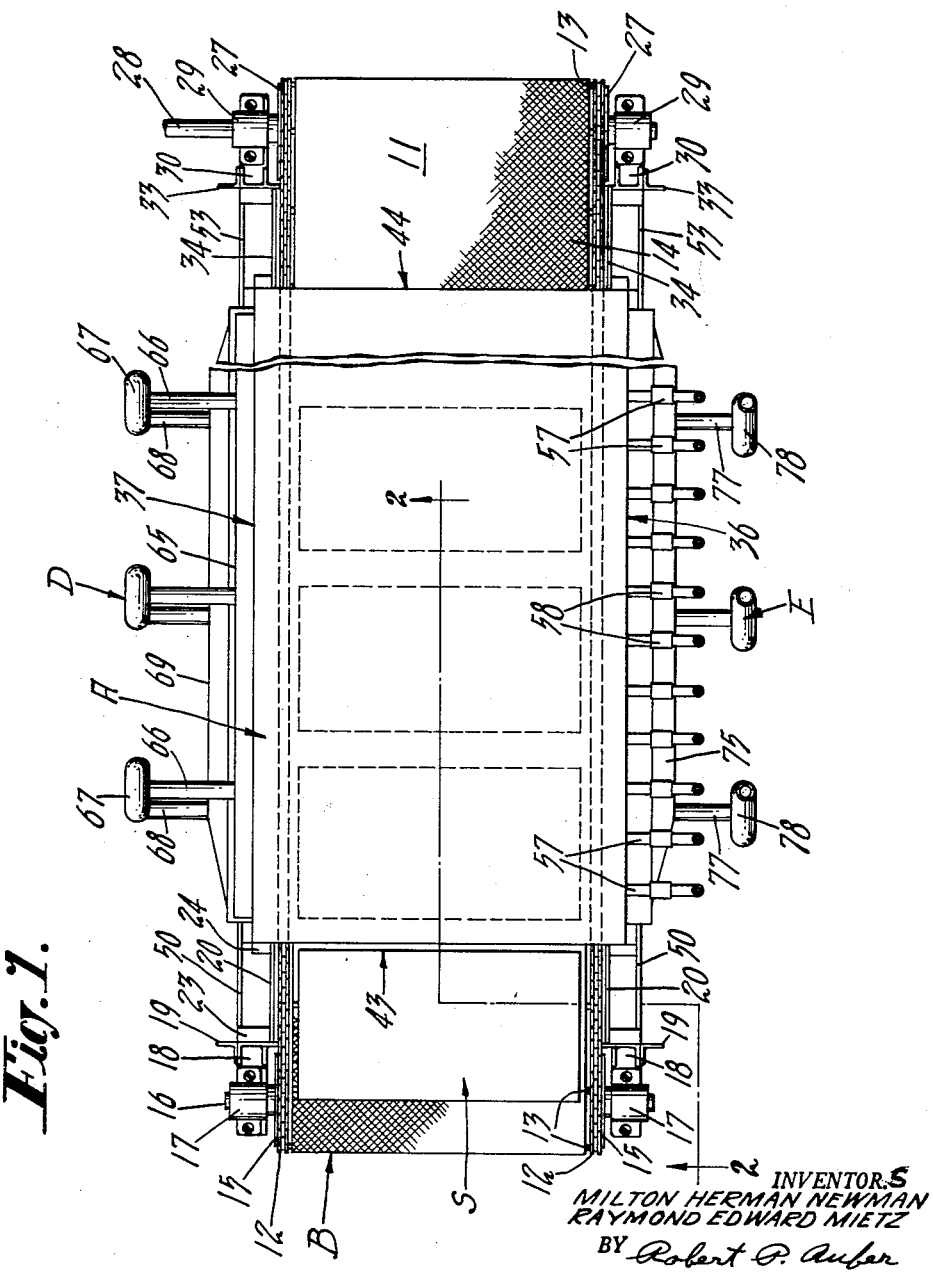

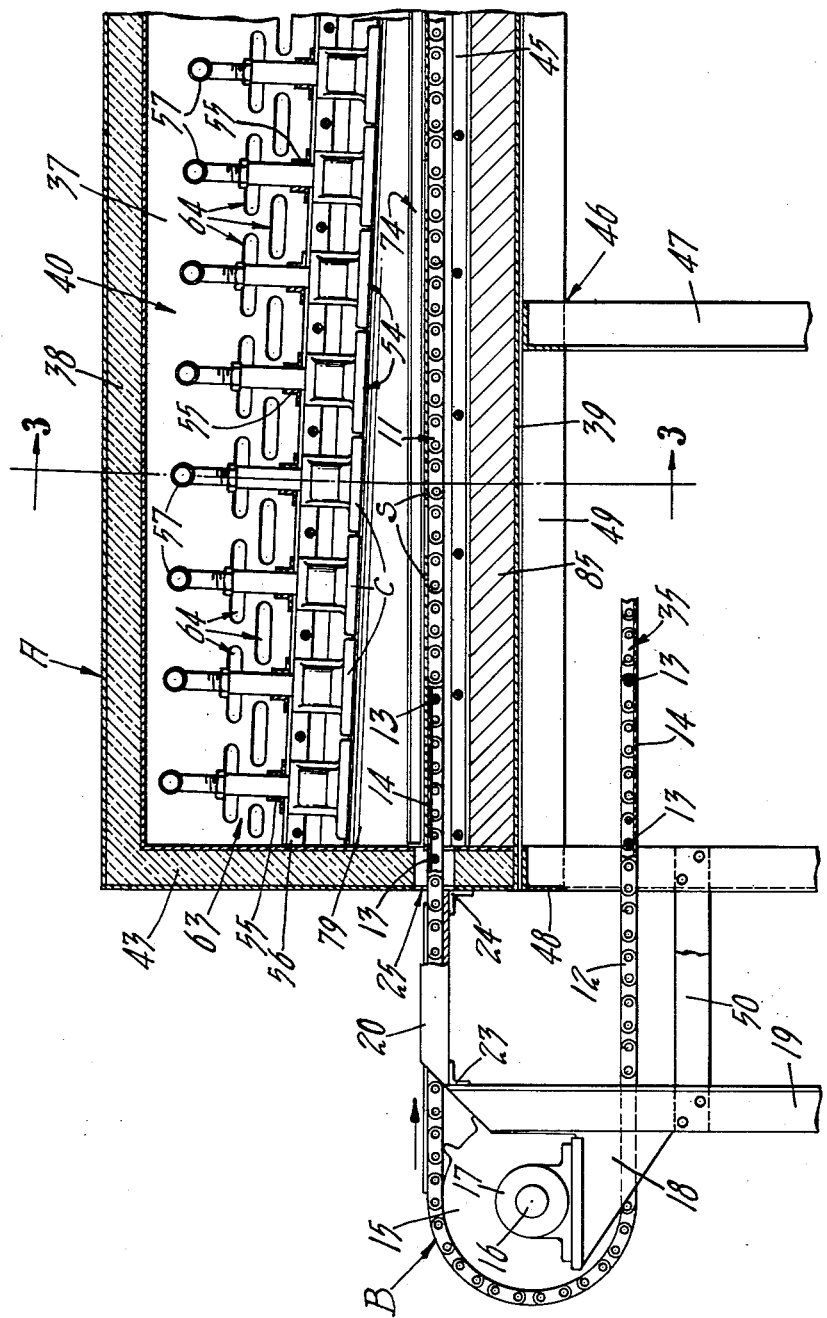

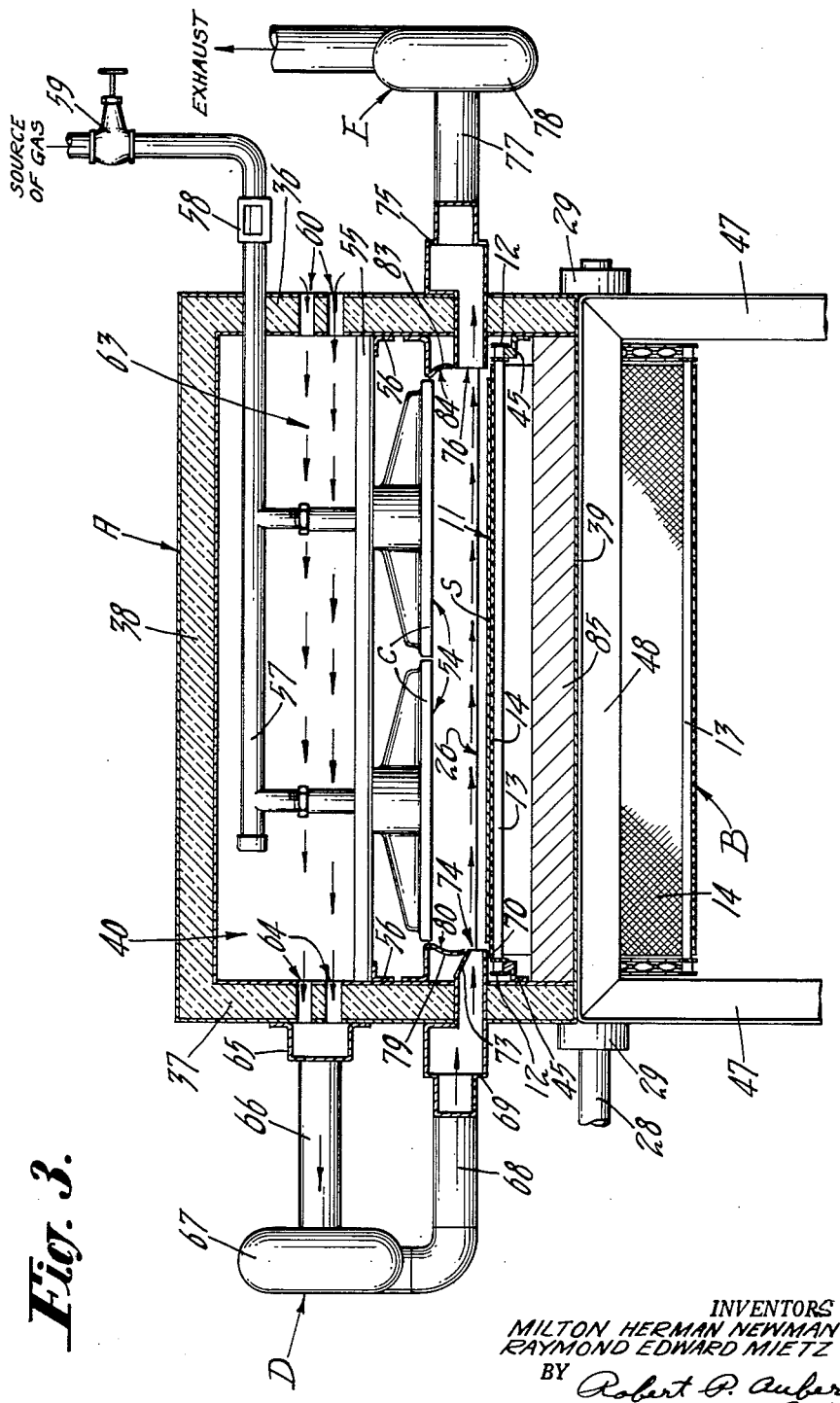

The present invention relates to the drying and baking of a wet organic coating on a metallic surface and has particular reference to a method of and apparatus for accomplishing the drying and baking operation at high speeds by using infra-red radiant heat to rapidly heat the coating to be dried while a blast of preheated air is continuously directed against and across the coated surface.

By far the most common practice in drying a wet coating on the surface of thin gauge metal in sheet or strip form involves passing the coated surface through an oven in which hot air is circulated to transfer heat from the air to both the coating and the metal substrate. The inherent slowness of this form of heat transfer is readily apparent. In an effort to increase production, industry has utilized large hot air ovens capable of holding a large quantity of coated metal at any one time. However, such large oven installations are not only costly, but also the space required to accommodate them becomes a problem.

In the past, various methods have been proposed to speed up the drying and baking process all of which are subject to certain disadvantages. One method has been to increase the temperature of the circulated air so that it is considerably above the vaporization temperature of the solvent to be removed thereby causing the coated metal to be heated more rapidly. However, under these conditions the surface of the coating is rapidly heated to the temperature of the heated air causing premature surface drying and consequent skinning over of the still wet coating. This surface skin impedes the escape of the remaining solvent vapors from beneath the surface and thereby tends to reduce the rate of further drying. Furthermore, if the heating is very rapid, the surface skin formed may be sufficiently impervious to the remaining solvent vapors so as to entrap them and cause bubbles or blisters to be formed in the coating.

Another method which has been used to speed up the drying process involves the direct application of heat to the under or uncoated side of the coated metal to rapidly heat the metal above the vaporization temperature of the solvent to be removed, in conjunction with the circulation of hot air to further heat the coated metal and remove the solvent vapors formed. With apparatus utilizing this method of operation, it is sometimes difficult to uniformly and rapidly apply the heat to the metal so as not to overheat portions of the coating and thereby produce detrimental effects. In order to overcome this difficulty, the apparatus tends to become undesirably complex.

Therefore, it is an object of the present invention to provide a method for the high speed drying and baking of decorative or other coating material on metallic surfaces which will overcome the problems hereinbefore pointed out.

Another object is to provide such a method whereby solvent is continuously and efficiently evaporated from the coating material regardless of the concentration of the solvent in the coating.

Another object is to provide such a method whereby the solvent is rapidly evaporated from the coating material without the formation of bubbles or ripples in the dried coating.

A further object is to provide an apparatus for rapidly drying coated metallic surfaces wherein a high efficiency of solvent evaporation is maintained during the drying operation regardless of the solvent concentration remaining in the coating.

A still further object is to provide such an apparatus wherein the solvent evaporating from the surface of the coating is quickly removed without causing the formation of ripples in the coated surface.

Numerous other objects and advantages of the invention will be apparent as it is better understood from the following description, which, taken in connection with the accompanying drawings, discloses a preferred embodiment thereof.

The apparatus utilized in the present invention includes a suitably supported insulated oven shell or casing A having conveyor means B for moving a freshly coated surface S through the oven shell A. A plurality of infra-red radiant heaters C are mounted within the oven shell A with their emissive surfaces facing the coated surface S for drying the wet coating. As the surface S is conveyed through the oven shell, an air delivery system D simultaneously blows pre-heated air at a high velocity against the suruface S through an opening in the oven shell substantially on the line of travel of the surface S. The air flows across the surface S to remove the volatilized solvents as soon as they escape from the coating and is exhausted through an opening on the opposite side of the oven which is connected to the air exhaust system E.

Referring to the drawings:

FIGURE 1 is a plan view of an oven for processing coated metal sheets embodying features of the present invention;

FIG. 2 is an enlarged fragmentary view showing a longitudinal section of the forward end of the oven taken substantially along line 2—2 of FIG. 1;

FIG. 3 is a sectional view taken substantially along line 3—3 of FIG. 2.

In the preferred or examplary embodiment of the invention shown in FIGURES 1, 2, and 3, the metal sheets S having a freshly applied coating on one surface are delivered to the horizontal conveyor B and deposited upon the upper run 11 thereof with the wet coated surface facing upwardly. The conveyor B comprises two endless chains 12 connected at uniform intervals by supporting rods 13 and an endless mesh belt 14 upon which the coated sheets S lie. The mesh belt 14 has a length substantially the same as the length of the chains 12 and a width substantially the same as the length of the supporting rods 13 and is fastened to the supporting rods so that it lies between the chains 12 with its edges adjacent to the chains. At the forward end of the oven (FIG. 2) the conveyor chains 12 pass over sprockets 15 which are carried on a horizontal shaft 16 journaled in bearings 17. Each bearing 17 is mounted on a bracket 18 secured to an upright support member 19. The upper run 11 of the conveyor B is supported in the region after it has left the sprockets 15 and before it has entered the oven casing A by support members 20 upon which the chains 12 slide. Each support member 20 is secured at one end to the upright support 19, an angle iron 23 being used for this purpose. The opposite end of each support member 20 is secured to an angle iron 24 which is rigidly attached to the forward end of the oven casing A.

The upper run 11 of the conveyor B passes into and through the oven casing A which has inlet and exit openings 25 and 26 respectively and is described more fully hereinafter. After the conveyor B leaves the oven casing A, the chains 12 pass over sprockets 27 mounted on a drive shaft 28 journaled in bearings 29. Each bearing 29 is mounted on a bracket 30 secured to an upright support member 33. Between the oven casing A and the sprockets 27, each chain 12 slides upon and is supported by a support member 34 secured at one end to the upright support member 33 and at the other end to the oven casing as hereinbefore described for the forward end of the oven.

The drive shaft 28 is rotated by a suitable source of motivating power (not shown) to rotate the sprockets 27 and thereby pull the upper run 11 of the conveyor B through the oven casing A. The lower run 35 of the conveyor between the sprockets 15 and 27 hangs free as it passes beneath the oven casing A and its weight is employed to maintain the upper run 11 in the required taut condition.

The oven casing A comprises an insulated side member 36, an insulated side member 37, an insulated top member 38 and a bottom member 39 suitably connected and reinforced to form a rigid rectangular box-like chamber 40 having an entrance end 43 and an exit end 44. The upper run 11 of the conveyor B is supported during its passage through the oven chamber A by guide rails 45 on which the chains 12 slide. The guide rails 45 are secured to the side members 36 and 37 and extend the length of the oven chamber 40 between the inlet opening 25 and exit opening 26.

The oven casing A is mounted upon a structural steel framework 46 consisting of upright supports 47 tied together by horizontal frame members 48 and longitudinal frame members 49. The upright support members 19 to which the bearing brackets 18 are secured are connected to the framework 46 by angle irons 50 to form a more rigid structure. In a similar manner, the upright support members 33 are connected to the framework 46 by angle irons 53.

A number of gas fired infra-red radiant burners C are mounted within the oven chamber 40 with their emissive surfaces 54 facing towards the conveyor and abutting one another to form the continuous bank or source of infra-red radiant heat. The burners C are secured to and supported by support members 55 which extend transversely of the oven chamber 40. The ends of the support members 55 rest upon and are supported by angle irons 56 which are fastened to the oven casing side members 36 and 37 and which run the full length of the oven chamber 40.

In the preferred embodiment shown in FIG. 2, the angle irons 56 are inclined with respect to the path of travel of the conveyor through the oven chamber 40 so that the emissive surfaces 54 of the heaters C are in increasing proximity with the coated surfaces of the sheets S as they pass through the oven. Obviously, the same result can be achieved by placing the burners C substantially in a horizontal plane and inclining the path of travel of the conveyor B relative thereto. With this configuration the temperature, i.e., gas input of each of the burners C is substantially the same and it is the closer spacing of the emissive surfaces 54 to the sheets S as they pass through the oven which produces the increased intensity of the radiation on the coating as it is being dried. In another modification, the emissive surfaces 54 of the burners C may all be substantially equally spaced from the mesh belt 14 and increased intensity of the radiant heat applied to the coating as the sheets S are conveyed through the oven. However, it is to be understood that if a slower and less efficient operation can be tolerated, the spacing between the burners and sheets and the intensity of radiation may be maintained constant throughout the length of the oven.

The burners C are connected to the gas supply by pipes 57 which extend through the side wall 36 into the oven chamber 40. Each of the supply pipes 57 has an air mixing member 58 and a control valve 59. As shown, the control valves 59 are of the manually operated type. Alternatively, motorized valves may be used and operated by means of an automatic controller connected to temperature sensing devices positioned at selected stations in the oven chamber 40. Such a method of control would automatically maintain predetermined temperatures at the respective stations in the oven chamber.

The air delivery system D consists of a series of ports 60 in the side wall 36 symmetrically located along the length of the oven chamber 40 through which air enters into a heating space 63 formed in the upper portion of the oven chamber. The lower surface of the heating space 63 is formed by the upper surfaces of the continuous bank of burners C. The air entering the heating space 63 absorbs heat from the upper surfaces of the burners C so that the preheating of the air is accomplished by utilizing heat that would otherwise be wasted.

The heated air is exhausted from the heating space 63 through a series of ports 64 in the side wall 37 which are similarly located and directly opposed to the ports 60. The ports 64 lead into a collecting duct 65 attached to the outside surface of the side wall 37 and running the length of the oven chamber 40. At suitable intervals the collecting duct 65 is connected by conduits 66 to the inlet openings of a series of air blowers 67. The blowers 67 pull atmospheric air into and through the heating space 63 and exhaust the preheated air through conduits 68 into a horizontal delivery duct 69. The delivery duct 69 extends through the side wall 37 and runs the full length of the oven chamber 40. The lower wall 70 of the delivery duct 69 is substantially level with the coated sheets as they lie on the mesh belt 14 of the conveyor. The upper wall 73 of the delivery duct 69 is inclined downwardly to form a converging outlet opening 74 adjacent the mesh belt 14. The converging outlet opening 74 accelerates the heated air to a substantial velocity as it is discharged into the oven chamber 40 and also directs it downwardly so that it impinges against the coated surface of the sheets S as they are being conveyed through the oven chamber. The velocity of the air at the outlet opening 74 should be at least 1000 feet per minute and is preferably 3000 to 4000 feet per minute.

The heated air flows substantially transversely across the coated surface of the sheets S to absorb the volatilized solvents escaping from the coating. The air is then removed from the oven chamber 40 by the air exhaust system E which comprises a horizontal exhaust duct 75 extending through the side wall 36 and having an opening 76 similarly located and directly opposed to the converging opening 74 in the delivery duct 69. The exhaust duct 75 runs the full length of the oven chamber 40 and is connected at suitable intervals by conduits 77 to the inlet openings of a series of air blowers 78. The blowers 78 pull the air through the oven chamber 40 across the coated sheets S and deliver the solvent laden air either to suitable exhaust stacks (not shown) or to a suitable solvent recovery system (not shown).

A reflector 79 secured to the inside surface of the side wall 37 has a curved surface 80 extending between the outermost edges of the burners C and the edge of the upper wall 73 of the delivery duct 69. The reflector 79 is made of a highly reflective material, e.g., a nickel alloy sheet which retains its bright surface at high temperatures. The curved surface 80 is shaped so as to reflect substantially all of the incident infra-red radiation to the coated surface of the sheets S. A reflector 83 secured to the inside surface of the opposite side wall 36 has a similarly curved reflective surface 84 between the opposite outermost edge of the burners C and the upper wall of the exhaust duct 75.

If desired, the inner surface of the bottom member 39 may be covered or lined with an infra-red absorbing material such as the magnesia block 85. The block 85 absorbs radiant heat energy which passes through the mesh belt 14, e.g., around the edges of the coated substrate and between successive sheets. The use of the infra-red absorber such as the block 85 is preferred to reduce to a minimum, if not eliminate reflecting the radiant heat energy back into the emissive surfaces 54. These surfaces are operated at a predetermined temperature, usually about 1650° F. Infra-red radiation reflected back into the emissive surfaces 54 tends to cause overheating thereof with consequent loss of control of the heating operation and in some cases, physical damage to the burners C.

The apparatus which is illustrated and described as a preferred or exemplary embodiment of the instant invention is designed to process sheets of tin plate or the like which have a wet coating on the metal surface facing the burners C, and it is the function of the apparatus to remove the volatile components thereby drying and hardening the coating. This apparatus is also an exemplification of the methods steps required for consummating the process of the invention. However, it is to be understood that other apparatus may be used to accomplish the required steps of the invention which would be equally suitable.

The apparatus heretofore described may also be used for drying freshly applied coatings on continuous metal strip. One means of accomplishing this is to have the coated strip supported on the conveyor mesh belt 14 and traveling through the oven casing A at the same speed as the conveyor B. Alternatively, the conveyor B can be dispensed with since the strip is self-supporting and the contour of the strip during its passage through the oven casing A can be controlled by providing pinch rolls at the forward and exit ends of the oven to keep the strip in tension while it travels through the oven casing. In some instances, due to the width of the strip or the length of the oven it would be necessary to provide additional support and guidance for the strip within the oven casing. One means of accomplishing this is to provide a series of guide rolls having a grooved surface in which the edges of the strip would be engaged thereby guiding the strip through the oven casing along a predetermined path of travel. With this type of oven, the strip may also travel vertically through the oven casing, with the infra-red radiant heaters, and circulated air inlet and outlet openings being positioned in the same relation with regard to the surface of the coating as was previously described for the preferred embodiment. The vertical oven configuration for coated strip has advantages over the horizontal type in that the support and guidance required is minimal and also the floor space required for the installation is decreased.

The invention described departs from the accepted procedures generally in use to dry thin coatings on metal surfaces by the placing of the infra-red heating source closer to the coating and by simultaneously blowing preheated air over the surface of the wet coating at a high velocity. Heretofore, it has been considered undesirable in drying ovens utilizing infra-red heaters to direct air against or across the wet coating except at a low velocity. It was reasoned that high velocity air blown against or across the surface of the coating tended to move or ripple the coating. Also, it has been the practice to position the infra-red heaters about ten inches or more from the surface of the coating to prevent premature drying or curing of the coating surface before solvent removal from the body of the coating is complete. As mentioned previously, if the surface skinning effect should occur, the unremoved solvent, in its effort to escape tends to cause bubbles or blisters to form in the coating.

Contrary to the prior art teaching, we have found that by the use of the novel combination disclosed in the instant invention wherein the infra-red heaters are positioned six inches or closer to the surface of the wet coating and simultaneously a high velocity blast of heated air is impinged against the coating, the solvent is rapidly removed and the drying time greatly reduced without producing any undesirable effects, such as bubbles or ripples, in the dried coating. As previously explained, the prime object of the instant invention is to dry the coating by the removal of the solvent therefrom in the briefest interval possible. By positioning the infra-red heaters very close to the wet coating, the coating is cured much more rapidly than with the greater spacing used in the prior art. However, for reasons not completely understood, in addition to the close spacing of the burners, the impingement of the high velocity heated air on the coating is also necessary to achieve the desired result. Further, experimental evidence indicates that the improved curing of the coating is not the result merely of temperature or heat energy alone. It is believed that the improved curing is due, at least in part, to some form of photochemical effect induced by the infra-red radiation.

While not wishing to be bound by any particular theory, the high velocity air may effect a scrubbing action on the surface of the wet coating thereby preventing the accumulation of solvent vapors contiguous the coating surface by sweeping them away and continuously providing an unsaturated atmosphere for further solvent removal. The extreme thinness of the coating may also contribute to the efficiency of the operation. However, no logical explanation is apparent as to why no rippling of the coating occurs when its surface is scrubbed by the high velocity air. In the preferred embodiment, an input air velocity of 3500 feet per minute is used. Furthermore, input air velocities up to 12,000 feet per minute have been used with no rippling of the coating surface or other adverse effects.

By the use of the instant invention it has been found possible to reduce the drying time of a clear phenolic coating applied to tin plate from the 10 to 12 minutes required in the conventional circulating hot air type of oven to 9 seconds. Also the present invention can be used in combination with the older type of circulating hot air ovens to speed up the output of these ovens and thereby increase the overall productive capacity. For example, for a clear phenolic coating on tin plate, the time required to effect complete drying has been found to be 3 seconds in the subject invention plus 3.2 minutes in the hot air oven as compared to 10 to 12 minutes in the hot air oven alone. This time can be further reduced when the coating is applied to black iron, aluminum, or other materials less reflective than tin plate. The time can also be reduced if the coating is pigmented, since the pigment increases the absorbtivity of the coating to infra-red radiation.

The temperature of the substrate metal is also raised by the passage of the coated sheet through the subject oven. Therefore, when the present invention is used as a pre-drying unit for a conventional hot air oven as discussed immediately above, the heated substrate enters the hot air oven at approximately the ambient temperature within the hot air oven. In this way, little or no time or heat energy is lost in the hot air oven bringing the metal up to the hot air oven temperature, thereby increasing the speed and efficiency of the conventional oven.

It is thought that the invention and many of its attendant advantages will be understood from the foregoing description and it will be apparent that various changes may be made in the form, construction, and arrangement of the parts and that changes may be made in the steps of the method described and their order of accomplishment without departing from the spirit and scope of the invention or sacrificing all of its material advantages, the form hereinbefore described being merely a preferred embodiment thereof.

We claim:

1. An apparatus for solidifying a liquid coating containing a film forming resin applied to a metal surface comprising: a plurality of gas fired infra-red heaters mounted adjacent to one another to form a substantially continuous emissive surface of infra-red radiation, means for conveying said coated surface along a path of travel past said emissive surface with said coating facing said emissive surface and being substantially equally spaced therefrom as measured in the direction transverse to said path of travel, said emissive surface directing infra-red radiation on to said coating with the radiation intensity at said coating being substantially constant in magnitude as measured in the direction transverse to said path of travel and increasing in magnitude in the direction of said path of travel, air means for blowing preheated air at a high velocity across and in a flow path next adjacent to said coating commencing immediately upon the exposure of said coating to said emissive surface and continuing during the entirety of said path of travel, said air means comprising nozzle means having an opening extending substantially continuously along said path of travel adjacent said conveying means with one boundary of said opening disposed substantially level wtih said coating as it moves along said path of travel, said nozzle means being adapted to impinge said air upon said coating at a high velocity in a direction substantially parallel with and transversely of said path of travel, and air exhaust means having an opening oppositely disposed from said nozzle opening whereby said air is urged into a flow path substantially parallel with said coating and in substantially continuous contact therewith as it flows across said coating.

2. The apparatus set forth in claim 1 wherein said heaters are disposed relative to said coated surface so that the distance between said coating and said emissive surface is progressively decreased as said coated surface is conveyed past said emissive surface.

3. The apparatus set forth in claim 2 wherein said distance is no more than six inches.

4. The apparatus set forth in claim 2 wherein said distance between said coating and asid emissive surface is initially six inches and decreases to two inches.

5. An oven for drying a liquid organic coating deposited on a flat metal sheet as said sheet is advanced therethrough comprising: an insulated casing, conveyor means for supporting and conveying said coated sheet along a path of travel through said casing, gas fired infra-red radiant heater elements mounted within said casing, said heater elements having rectangular emissive surfaces disposed adjacent to one another to form a substantially continuous surface of infra-red radiation having a transverse width at least equal to the maximum width of said coated sheet, said radiation surface being spaced from and facing said coated sheet as it moves along said path of travel, the distance between said radiation surface and said coating decreasing in magnitude along said path of travel and being substantially constant in magnitude is measured in the direction transverse to said path of travel, said radiation surface directing infra-red radiation on to said coating with the intensity of the radiation incident on said coating being substantially constant as measured in the direction transverse to said path of travel and increasing in the direction of said path of travel, air means for preheating a supply of air and blowing said preheated air across said coating at a high velocity commencing immediately upon and continuing during the exposure of said coating to said radiation surface, said air means comprising nozzle means having a substantially continuous opening extending along said path of travel with one boundary of said opening being substantially level with said coating as it moves along said path of travel, said nozzle means being adapted to impinge said air upon said coating at a high velocity in a direction substantaily parallel with and transversely of said path of travel, means oppositely disposed from said nozzle means for exhausting said air from said casing, said nozzle means and said exhaust means cooperatively causing said air to flow transversely across said coating in substantially continuous contact therewith, and heater element control means for regulating the intensity of the radiation directed on to said coating.

6. The oven set forth in claim 5 wherein said distance is no more than six inches.

7. The oven set forth in claim 5 wherein said distance between said coating and said radiation surface is initially 6 inches and decreases to 2 inches.

8. The oven set forth in claim 5 wherein said air preheating means comprises a chamber formed by surfaces of said heater elements opposite from said emissive surfaces thereof and by adjacent surfaces of said casing, a plurality of air inlet openings in said casing adjacent said surfaces of said heater elements for admitting air into said chamber, a plurality of air outlet openings in said casing oppositely disposed from said air inlet openings, and means for causing air to flow into said chamber through said inlet openings, across said surfaces of said heater elements to absorb heat therefrom, and out of said air outlet openings.

9. A method of drying at a high speed a wet organic coating containing a volatile solvent deposited on a metal sheet comprising the steps of: conveying said metal sheet along a path of travel past a substantially continuous emissive surface of infrared radiation with said coating facing said emissive surface and spaced a predetermined distance therefrom, said spacing being substantially constant in magnitude in the direction transverse to said path of travel, directing said infra-red radiation on to said coating to heat the same and volatilize said solvent, maintaining the intensity of said radiation incident on said coating at a constant magnitude as measured in the direction trnsverse to said path of travel and increasing in magnitude in the direction of said path of travel, preheating a continuous stream of air to a temperature of at least 150° F., blowing said preheated air at a high velocity from an opening disposed substantially on the level of said coating against and across said coating in a direction substantially parallel with and transversely of said path of travel, said high velocity air moving transversely across said coating in a flow path next adjacent to said coating and in substantially continuous contact therewith, said air flow commencing immediately upon and continuing entirely during the exposure of said coating to said radiation.

10. The method set forth in claim 9 wherein said heated air has a temperature of 150 to 350° F.

11. The method set forth in claim 9 wherein the velocity of said air is initially at least 1000 feet per minute.

12. The method set forth in claim 9 wherein the velocity of said air is initially 3000 to 3500 feet per minute.

References Cited in the file of this patent

UNITED STATES PATENTS

| | | |
|---|---|---|
| 1,472,741 | Ayres | Oct. 30, 1923 |
| 2,012,115 | Woodruff | Aug. 20, 1935 |
| 2,113,770 | Richardson | Apr. 12, 1938 |
| 2,355,671 | Naeher et al. | Aug. 15, 1944 |
| 2,419,876 | Birdseye | Apr. 29, 1947 |
| 2,428,090 | Naeher | Sept. 30, 1947 |
| 2,529,704 | Olsen | Nov. 14, 1950 |
| 2,861,354 | Hultgreen | Nov. 25, 1958 |
| 2,884,705 | Flynn | May 5, 1959 |
| 3,062,520 | Frey | Nov. 6, 1962 |